US006581120B1

(12) United States Patent
Ko

(10) Patent No.: US 6,581,120 B1
(45) Date of Patent: Jun. 17, 2003

(54) INTERRUPT CONTROLLER

(75) Inventor: Nam Kon Ko, Seoul (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/436,739

(22) Filed: Nov. 9, 1999

(30) Foreign Application Priority Data

Dec. 5, 1998 (KR) ........................................ 1998-53289

(51) Int. Cl.[7] .............................................. G06F 13/24
(52) U.S. Cl. ...................................... 710/262; 710/260
(58) Field of Search ................................. 710/260, 264, 710/262, 266; 712/233

(56) References Cited

U.S. PATENT DOCUMENTS 5,197,136 A * 3/1993 Kimura et al. ............... 712/238
5,812,837 A * 9/1998 Ozawa ......................... 710/261
5,901,309 A * 5/1999 Hammer et al. ............. 710/266

* cited by examiner

Primary Examiner—Xuan M. Thai
(74) Attorney, Agent, or Firm—Fleshner & Kim, LLP

(57) ABSTRACT

An interrupt controller can execute a faster interrupt service routine after an occurrence of the interrupt by writing branch instructions upon initialization of the computer environment in advance of the actual interrupt. The interrupt controller includes an interrupt mask register that receives, and stores an interrupt on/off instruction from a CPU. An interrupt priority register receives and stores an interrupt priority instruction from the CPU. An interrupt mask circuit unit selectively receives and forwards an interrupt generating signal from peripheral devices in response to an interrupt on/off instruction from the interrupt mask register. A priority determining circuit unit receives the interrupt generating signals from the interrupt mask circuit unit, determines priorities of the interrupt signals in response to the interrupt priority instruction from the interrupt priority register, and forwards an interrupt priority signal to an interrupt terminal of the CPU. An interrupt status register stores information pertaining to the source peripheral device from an interrupt signal output from the priority determining circuit unit, and provides a register selection signal corresponding to the source peripheral device information. An interrupt instruction register stores a branch instruction received from the CPU for use upon reception of the interrupt, and provides an interrupt instruction to the CPU in response to a register selection signal from the interrupt status register. In addition, a bus interface circuit unit transfers an address signal between the CPU and the interrupt controller, and a buffer unit buffers a data signal from the CPU to the interrupt controller.

21 Claims, 5 Drawing Sheets

FIG.6

IR common-memory

| 31 | 23 | 16 15 | 8 7 | 0 | |
|---|---|---|---|---|---|
| 11101010 | 0 0 | 0 0 | 0 2 | | IR#0 |
| | 0 0 | 4 0 | 2 0 | | IR#1 |
| | F F | F F | F 8 | | IR#2 |
| | ⋮ | ⋮ | ⋮ | | ⋮ |
| | 0 0 | 0 5 | 0 0 | | IR#(N−1) |
| | F 0 | 0 6 | 1 0 | | IR#N |

INTERRUPT CONTROLLER

BACKGROUND OF THE INVENTION

1. Field of the Invention

The present invention relates to an interrupt controller for a Micro Controller Unit (MCU), and more particularly, to an interrupt controller which can efficiently execute an interrupt service.

2. Background of the Related Art

In general, an interrupt is a pausing of the execution of a first program to execute another program. When a condition occurs that requires an interruption, the first program is temporarily stopped, and operating control jumps to a different address. Then, an interrupt processing program accessible from the different address is executed. Upon completion of the interrupt processing program, the control returns to the first (interrupted) program, and execution of the first program resumes. Accordingly, effective program processing of simultaneously operated input and output devices can be achieved with effective on-line processing. Related art interrupt controllers often manage numerous type of interrupts, such as input/output completion interrupts, program interrupts, monitoring interrupts and fault interrupts.

FIG. 1 illustrates a system including a related art interrupt controller 3 connected to peripheral devices 2 and to a CPU 1. The interrupt controller 3 is operative between the, CPU 1 and the peripheral devices 2.

As shown in FIG. 1, the related art interrupt controller 3 is provided with an interrupt mask register 4 for receiving and storing interrupt on/off instructions from the CPU 1. An interrupt priority register 5 receives and stores interrupt priority instructions from the CPU 1. An interrupt mask circuit unit 6 selectively receives, and forwards interrupt generating signals, such as INT0, INT1, INT2, . . . INTn, from the peripheral devices 2 in response to an interrupt on/off instruction from the interrupt mask register 4.

A priority determining circuit unit 7 receives the interrupt generating signals from the interrupt mask circuit unit 6, determines priorities of the interrupt generating signals in response to the interrupt priority instruction from the interrupt priority register 5, and forwards an interrupt priority signal to an interrupt terminal at the CPU 1. An interrupt status register 9 stores information of an interrupt signal from a source peripheral device 2 forwarded from the priority determining circuit unit 7. A bus interface circuit unit 8 inputs and outputs an address signal between the CPU 1 and the interrupt controller 3. A buffer unit 10 buffers a data signal from the CPU 1 to the interrupt controller 3. Here, each register is connected to an internal data bus.

FIG. 2 illustrates a sequence diagram showing a related art method for controlling an interrupt. As shown in FIG. 2, interrupt signals INT0, INT1, - - - , INTn, generated in different peripheral devices 2, are output to the interrupt mask circuit unit 6. However, the interrupt signals generated in the peripheral devices 2, that are not acceptable to the interrupt mask circuit unit 6 based on interrupt on/off instructions stored in the interrupt mask register 4, do not affect interrupt operations. The interrupt generating signals from the interrupt mask circuit unit 6 are provided to the priority determining circuit unit 7. The priority determining circuit unit 7 determines priorities of the interrupt signals, received in response to an interrupt priority instruction from the interrupt priority register 5, and forwards the priority signal to the interrupt terminal at the CPU 1. At the same time, record information on a source peripheral device 2, which provides the interrupt signal to the CPU 1, is stored at the interrupt status register 9.

As an interrupt is generated, at step S1, the CPU 1 executes an instruction to stop running the present program and branch to a location where there is an interrupt service routine, for example, to location 18h. That is, 18h includes an instruction to branch to the interrupt service routine. At step S2, processing for other interrupts is disabled, because during execution of the service routine, execution of other interrupts is forbidden. At step S3, the system reads information from the interrupt status register 9 in the interrupt controller 3. At step S4, the information is analysed to find the peripheral device that generated the interrupt. At step S5, an address of an actual service routine of the device is determined, and at step S6, the actual service routine is accessed and executed, to process the interrupt generated by the interrupt controller 3.

However, as described above, the related art interrupt controller has various disadvantages. For example, the foregoing related art interrupt controller and method for controlling an interrupt have a slow response time. Upon entering into the interrupt service routing, the sequential steps of reading the interrupt status register to determine a peripheral device that generated the interrupt, and calculating an address to branch to for making the actual interrupt service, results in a prolonged response time from the generation of the interrupt to the response.

The above references are incorporated by reference herein where appropriate for appropriate teachings of additional or alternative details, features and/or technical background.

SUMMARY OF THE INVENTION

An object of the present invention is to substantially obviate one or more of the problems due to limitations and disadvantages of the related art.

Another object of the present invention is to provide a faster response time from the generation of an interrupt.

Another object of the present invention is to executes the actual interrupt service directly after sending an interrupt signal.

Another object of the present invention is to use an interrupt instruction register that stores a plurality of branch information regarding interrupts for the CPU prior to receipt of one of the corresponding interrupts from a corresponding plurality of peripheral devices.

The above objects of the present invention can be achieved, in a whole or in part, by an interrupt controller and method that includes an interrupt mask register that receives and stores an interrupt on/off instruction from a CPU. An interrupt priority register receives and stores an interrupt priority instruction from the CPU. An interrupt mask circuit unit selectively receives and forwards interrupt generating signals from peripheral devices, in response to an interrupt on/off instruction from the interrupt mask register. A priority determining circuit unit receives the interrupt generating signals from the interrupt mask circuit unit and determines priorities of the interrupt generating signals, in response to the interrupt priority instruction from an interrupt priority register, and forwards a priority signal to an interrupt terminal at the CPU.

An interrupt status register stores information of an interrupt signal from a source peripheral device, forwarded from the priority determining circuit unit, and provides a register selection signal corresponding to the information. An interrupt instruction register stores a branch instruction received from the CPU, and provides an interrupt instruction to the CPU in response to a register selection signal, that is received from the interrupt status register. A bus interface circuit unit transfers an address signal between the CPU and the interrupt controller. The interrupt controller also includes a buffer unit that buffers a data signal from the CPU to the interrupt controller.

To further achieve the above objects in a whole or in parts, there is provided an interrupt controller according to the present invention that includes an interrupt instruction unit that stores branch instruction data for processing an interrupt, a bus interface unit, and an interrupt instruction unit. Prior to an occurrence of the interrupt, the bus interface unit transfers the branch instruction data from a CPU to the interrupt instruction unit. After the occurrence of the interrupt, the bus interface unit provides a control signal to the interrupt instruction unit. Further still, after the occurrence of the interrupt, the interrupt status unit provides a selection information corresponding to at least one peripheral device, and the interrupt instruction unit provides an interrupt instruction corresponding to the branch instruction data to the CPU, based on the control signal and the selection information.

To further achieve the above objects in a whole or in parts, there is provided a method for operating an interrupt controller according to the present invention that includes the steps of transferring a branch instruction data from a CPU to an interrupt instruction unit prior to an occurrence of an interrupt, providing, a control signal to the interrupt instruction unit after the occurrence of the interrupt, providing a selection information corresponding to at least one peripheral device after the occurrence of the interrupt, and providing an interrupt instruction to the CPU based on the control signal and the selection information.

Additional advantages, objects, and features of the invention will be set forth in part in the description, which follows, and in part will become apparent to those having ordinary skill in the art upon examination of the following, or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

Figure 1:
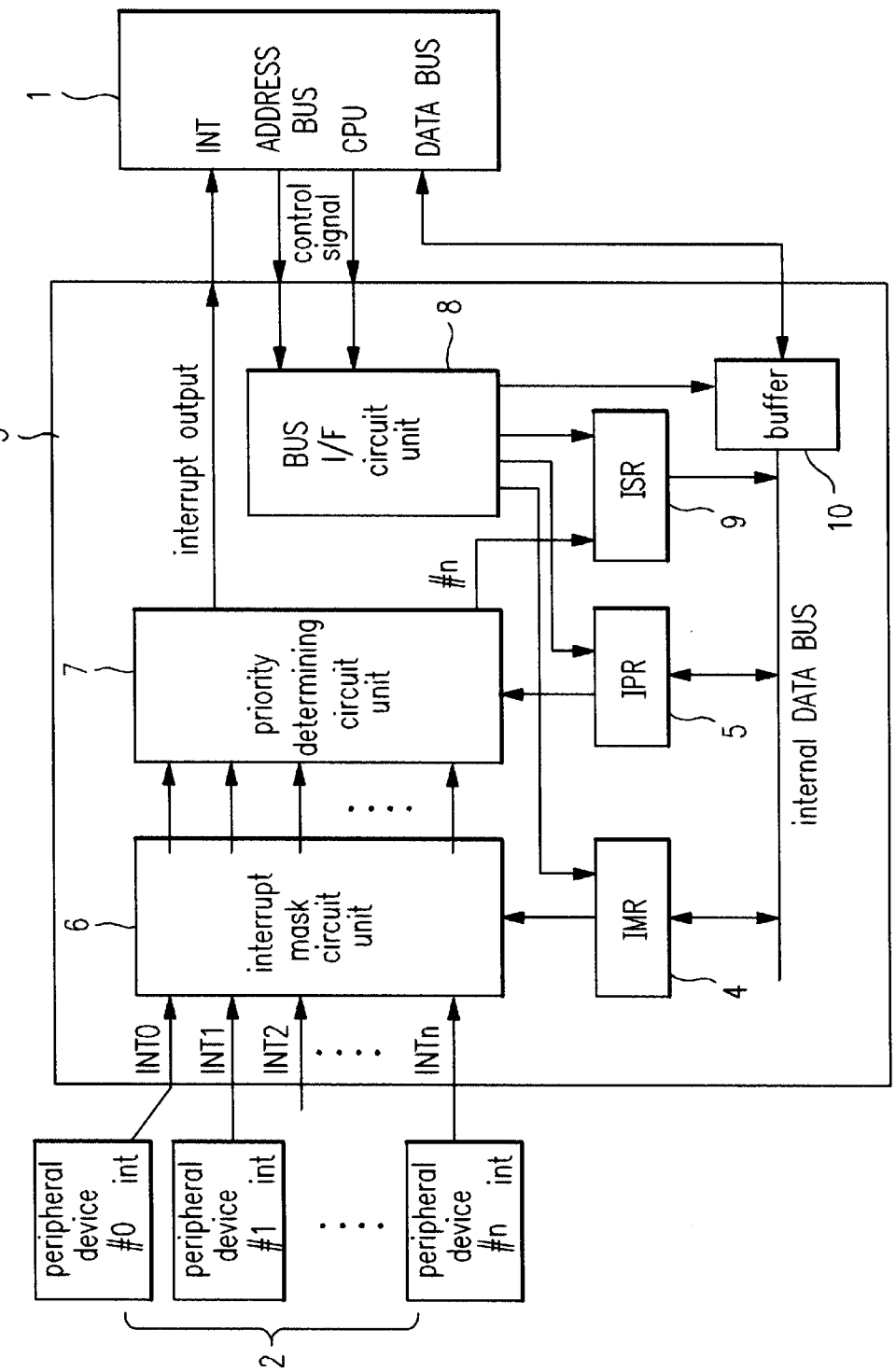
FIG. 1 illustrates a block diagram of a related art interrupt controller having connections to peripheral devices and a CPU.
Figure 2:
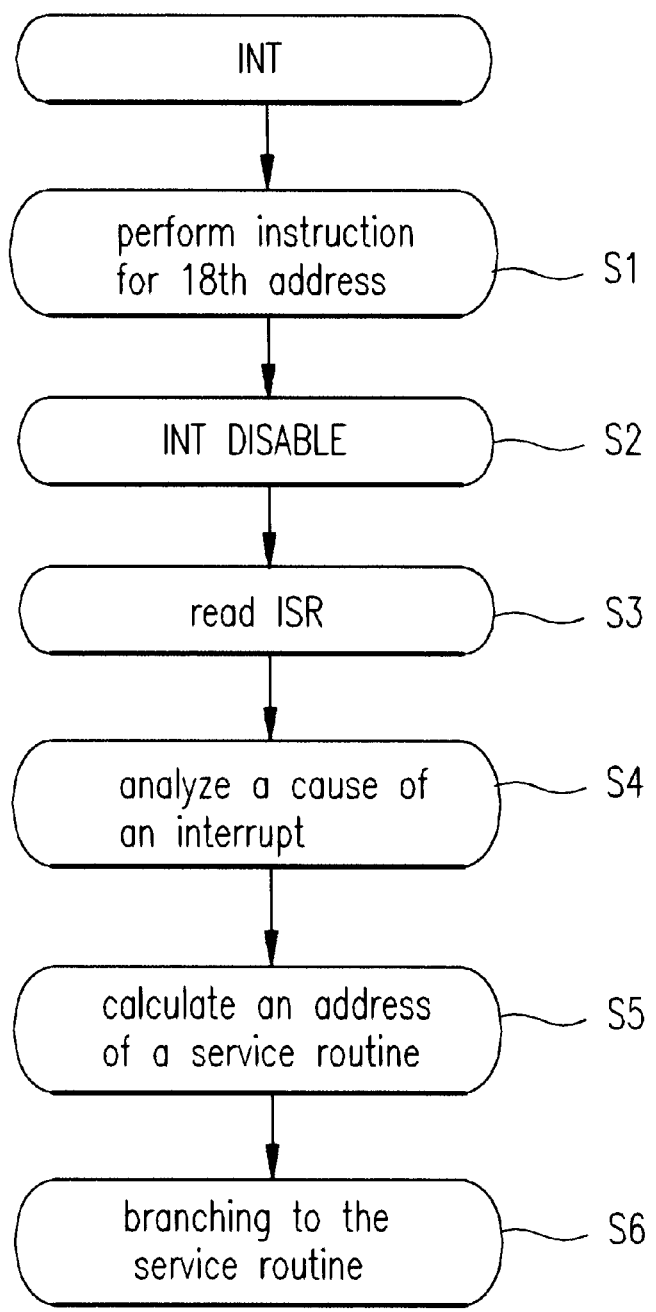
FIG. 2 illustrates a sequence diagram showing a related art method for controlling an interrupt.
Figure 3:
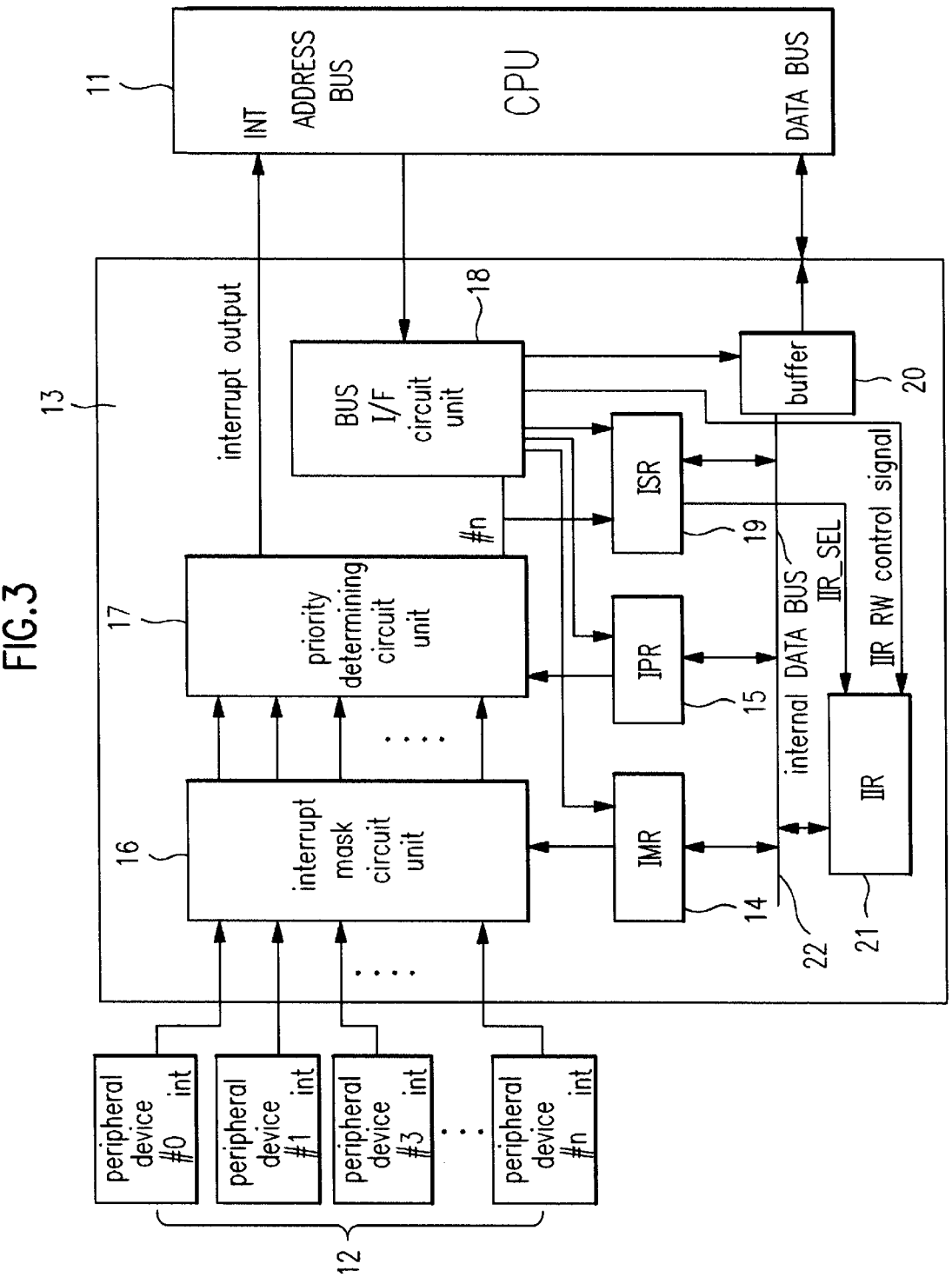
FIG. 3 illustrates a block diagram of an interrupt controller in accordance with a preferred embodiment of the present invention.

As shown in FIG. 3, the interrupt controller 13 is operative between a CPU 11 and peripheral devices 12. The interrupt controller 13 includes an interrupt mask circuit unit 16, a priority determining circuit unit 17, a BUS I/F circuit unit 18, an interrupt mask register (IMR) 14, an interrupt priority register (IPR) 15, an interrupt status register (ISR) 19, a buffer 20, and an interrupt instruction register (IIR) 21.

The interrupt mask register 14 receives and stores an interrupt on/off instruction from the CPU 11. The interrupt priority register 15 receives and stores an interrupt priority instruction from the CPU 11. The interrupt mask circuit unit 16 selectively receives and forwards an interrupt generating signal, such as INT0, INT1, INT2, . . . INTn, from the peripheral devices 12, in response to an interrupt on/off instruction from the interrupt mask register 14.

The priority determining circuit unit 17 receives the interrupt generating signal from the interrupt mask circuit unit 16, determines priorities of the interrupt signals in response to the interrupt priority instruction received from the interrupt priority register 15, and forwards an interrupt priority signal to an interrupt terminal of the CPU 11. The interrupt status register 19 stores information pertaining to the source peripheral device 12 based on an interrupt priority signal output from the priority determining circuit unit 17. The interrupt status register 19 also provides a register selection signal IIR-SEL corresponding to the source peripheral device information.

The bus interface circuit unit 18 transfers an address signal, between the CPU 11 and the interrupt controller 13, to provide control signals between the CPU 11 and the registers in the interrupt controller 13. The bus interface circuit unit 18 also provides an interrupt read/write control signal (IIR-R/W) to the interrupt instruction register (IIR) 21. The interrupt instruction register 21 stores a branch instruction and outputs an interrupt instruction to the CPU 11 via the buffer 20 upon reception of the interrupt in response to the register selection signal (IIR-SEL) and the control signal (IIR-R/W). The buffer 20 also buffers a data signal from the CPU 11 to the interrupt controller 13. The CPU 11 executes an actual interrupt service routine based on the branch instruction. Here, all the registers in the interrupt controller 13 are connected to an internal data bus.

Figure 4:
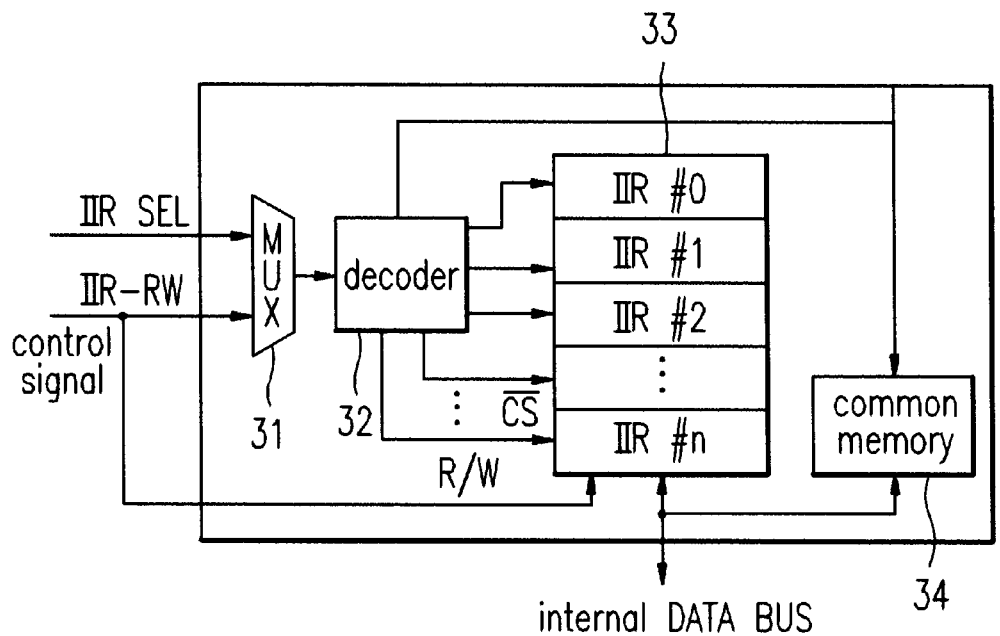
FIG. 4 illustrates an example interrupt instruction register in accordance with a preferred embodiment of the present invention.

FIG. 4 illustrates an example interrupt instruction register in accordance with a preferred embodiment of the present invention. The interrupt instruction register 21 includes a multiplexer 31, that receives both the interrupt instruction register selection signal IIR-SEL, and the interrupt instruction register read/write signal IIR-R/W. The multiplexer 31 selectively outputs an address signal to a decoder 32, which decodes the address signal and outputs register cell selection signals (CS) to a register unit 33. The register unit 33 stores data received through the internal data bus in response to the register cell selection signal. A common memory 34 stores a common portion of the information received by the register unit 33.

Figure 5:
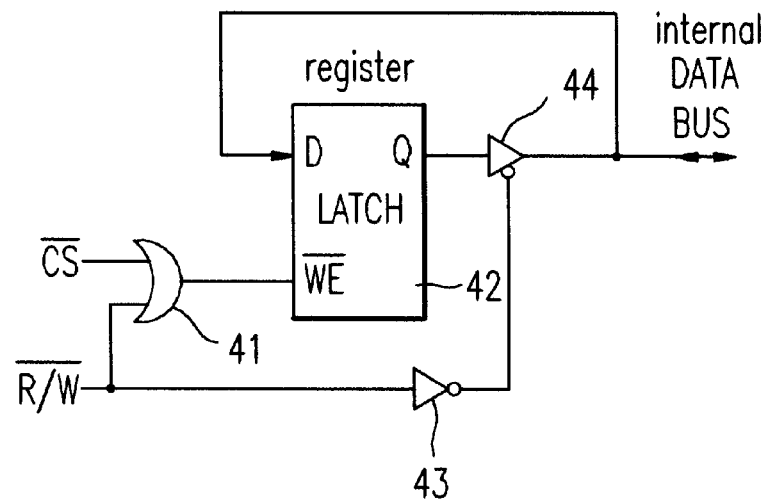
FIG. 5 illustrates a portion of an interrupt instruction register in accordance with a preferred embodiment of the present invention; and, FIG. 6 illustrates a table explaining an example operation of an interrupt instruction register in accordance with a preferred embodiment of the present invention.

FIG. 5 shows an example interrupt instruction register unit 33 having a one bit structure in accordance with a preferred embodiment of the present invention. The single bit structure includes an OR gate 41 that logically sums register cell selection signals and corresponding read/write control signals. A latch unit 42 latches an output data using a signal output from the OR gate 41 as a write enable signal ($\overline{WE}$). An inverter 43 inverts the read/write control signal, and outputs the inverted signal to a buffer unit 44. The buffer unit 44 buffers an output from the latch unit 42 in response to the signal output from the inverter 43.

FIG. 6 illustrates a table for explaining an example operation of the interrupt instruction register 21 shown in FIGS. 3–5. Upon initialization of a computer system that includes an interrupt controller 13 in accordance to the preferred embodiment, the CPU 11 generates a branch instruction for use when an interrupt is generated. The CPU 11 outputs the branch instruction to the common memory 34 and the register units 33 located in the interrupt instruction register 21.

When an interrupt signal from a peripheral device 12 is generated during a regular operation of the system, the interrupt signal generated in the peripheral device 12 is provided to the interrupt terminal at the CPU 11, as the interrupt priority signal, via the interrupt mask circuit unit 16 and the interrupt priority determining circuit unit 17. The interrupt status register 19 selects an interrupt instruction corresponding to the peripheral device 2 which generated the interrupt, and outputs the register selection signal to the interrupt instruction resister 21. Then, the interrupt instruction register 21 provides the instruction to the CPU 11, which immediately executes an appropriate interrupt service routine. For example, upon reception of the interrupt signal during a regular operation, the CPU 11 controls the program counter to jump from 18h to 20h, and read an instruction of a selected register value in the register units 33 of the interrupt instruction register 21, to execute an interrupt service. As shown in FIG. 6, if IIR #0 of the interrupt controller is selected. Then $02_{16}$ is stored in the IIR #0, and may be expresses in binary as $10_2$. However, since $10_2$ is shifted by 2 bits to the left when read, the $10_2$ becomes $1000_2$. A jump of 8, corresponds to $1000_2$, and the program counter branches from the present location 20h to 28h, to execute an interrupt service.

Similarly, if an IIR #1 register unit is selected from the interrupt instruction register 21, the $4020_{16}$ is equal to $4(0100_2)$, $0(0000_2)$, $2(0010_2)$, and $0(0000_2)$, to become $100,0000,0010,0000_2$, and is shifted 2 bits to the left to equal $1,0000,0000,1000,0000_2$. Since a jump of 65,794 corresponds to $1,0000,0000,1000,0000_2$, the program counter branches from 20h, to the address of 65,814h.

When an IIR #2 is selected, the instruction FF FF $F8_{16}$ is a 2's complement, and requires a jump of −20 to execute the interrupt service. A jump of −20 branches the program counter from the present location 20h to 0h.

An interrupt branch instruction is stored in the interrupt instruction register 21 for each peripheral device 12. As the CPU 11 is initialized and an interrupt signal is generated, from one of the peripheral devices 12, the interrupt signal is provided to the CPU 11, through the priority determining circuit unit 17. Then, the peripheral device 12 that generated the interrupt is determined, and a pertinent register unit in the interrupt instruction register 21 is selected. The CPU 11 calculates an instruction written on a pertinent register unit, associated with the principal device, to execute an interrupt service.

The interrupt controller of the preferred embodiments of the present invention lowers the interrupt response speed because the interrupt controller 13 writes branch instructions upon initialization of the CPU 11, in advance of an actual interrupt. The branch instructions are processed upon generation of the interrupt, and are stored at the common memory 34 and the register unit 33. Therefore, the interrupt instruction register 21 executes the actual interrupt service directly after reading an interrupt signal. Accordingly, the interrupt controller 13 of the preferred embodiments facilitates a very fast interrupt response speed.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An interrupt controller comprising:

an interrupt mask register that receives and stores an interrupt on/off instruction from a CPU;

an interrupt priority register that receives and stores an interrupt priority instruction from the CPU;

an interrupt mask circuit unit that selectively receives, and provides interrupt generating signals from a peripheral device in response to the interrupt on/off instruction from the interrupt mask register;

a priority determining circuit unit that receives the interrupt generating signals from the interrupt mask circuit unit, determines priorities of the interrupt generating signals in response to the interrupt priority instruction from the interrupt priority register, and forwards an interrupt priority signal to an interrupt terminal at the CPU;

an interrupt status register that stores information related to a peripheral device from the interrupt priority signal, and provides a register selection signal corresponding to the information;

a buffer unit that buffers a data signal between the CPU and the interrupt controller;

an interrupt instruction register that stores a branch instruction received from the CPU for processing an interrupt, and provides an interrupt instruction to the CPU via the buffer unit in response to the register selection signal output from the interrupt status register; and a bus interface circuit unit that transfers an address signal between the CPU and the interrupt controller, transfers, prior to an occurrence of the interrupt and upon an initialization of a CPU, the branch instruction from the CPU to the interrupt instruction register for storage, and provides a read/write control signal to the interrupt instruction register.

2. The interrupt controller of claim 1, further comprising:

an internal data bus that connects the interrupt mask register, the interrupt priority register, the interrupt status register, and the interrupt instruction register;

a register selection signal line that connects the interrupt status register and the interrupt instruction register; and an interrupt instruction read/write control signal line that connects the bus interface circuit unit and the interrupt instruction register.

3. The interrupt controller of claim 2, wherein the interrupt instruction register includes:

a multiplexer that receives the register selection signal and the read/write control signal and selectively provides an address signal;

a decoder that decodes the address signal from the multiplexer and provides register cell selection signals;

a plurality of register units that store data received through the internal data bus based on the register cell selection signals provided by the decoder; and a common memory that stores a common portion of the data stored by the register units.

4. The interrupt controller of claim 3, wherein the interrupt instruction register includes:
   an OR gate that logically sums respective register cell selection signals and read/write control signals;
   a latch unit that latches a write enable signal based on a signal from the OR gate;
   an inverter that inverts the read/write control signal; and
   a buffer unit that buffers an output from the latch unit in response to a signal from the inverter.

5. An interrupt controller, comprising:
   an interrupt instruction unit that stores branch instruction data for processing an interrupt;
   a bus interface unit that, prior to an occurrence of the interrupt and upon an initialization of a CPU, transfers the branch instruction data from the CPU to the interrupt instruction unit, and that, after the occurrence of the interrupt, provides a control signal to the interrupt instruction unit; and
   an interrupt status unit that, after the occurrence of the interrupt, provides a selection information corresponding to at least one peripheral device,
   wherein the interrupt instruction unit provides an interrupt instruction corresponding to the branch instruction data to the CPU, based on the control signal and the selection information.

6. The interrupt controller of claim 5, wherein the interrupt instruction unit includes:
   a multiplexer that receives the selection information and the control signal and selectively provides an address signal;
   a decoder that decodes the address signal from the multiplexer, and provides register cell selection signals; and
   a plurality of register units that store data received via an internal data bus based on the register cell selection signals.

7. The interrupt controller of claim 6, wherein the interrupt instruction unit further includes a common memory that stores a common portion of the data stored by the register units.

8. The interrupt controller of claim 5, wherein the interrupt instruction unit includes:
   an OR gate that logically sums respective register cell selection signals and read/write control signals;
   a latch unit that latches a write enable signal based on a signal from the OR gate;
   an inverter that inverts the read/write control signal; and
   a buffer unit that buffers an output from the latch unit in response to a signal from the inverter.

9. The interrupt controller of claim 5, further comprising:
   an interrupt mask unit that receives an interrupt on/off instruction from a CPU;
   an interrupt priority unit that receives an interrupt priority instruction from the CPU;
   an interrupt mask unit that receives interrupt generating signals from a peripheral device based on the interrupt on/off instruction;
   a priority determining unit that receives the interrupt generating signals from the interrupt mask unit, and determines priority of the interrupt signals in response to the interrupt priority instruction from the interrupt priority unit, and forwards an interrupt priority signal to an input terminal at the CPU.

10. The interrupt controller of claim 9, further comprising a buffer unit that buffers the data signal between the CPU and the interrupt controller.

11. The interrupt controller of claim 9, further comprising:
   an internal data bus that connects the interrupt mask, the interrupt priority unit, the interrupt status unit, and the interrupt instruction unit;
   a register selection signal line that connects the interrupt status unit and the interrupt instruction unit; and
   an interrupt instruction read/write control signal line that connects the bus interface unit in the interrupt instruction unit.

12. A method for operating an interrupt controller, comprising:
   (a) transferring a branch instruction data from a CPU to an interrupt instruction unit prior to an occurrence of an interrupt and upon an initialization of the CPU;
   (b) providing a control signal to the interrupt instruction unit after the occurrence of the interrupt;
   (c) providing a selection information corresponding to at least one peripheral device, after the occurrence of the interrupt; and
   (d) providing an interrupt instruction based on the control signal and the selection information.

13. The method of claim 12, further comprising determining a peripheral device of a plurality of peripheral devices that generated the interrupt.

14. The method of claim 12, wherein the step (d) includes:
   providing an address signal based on the control signal and the selection information,
   decoding the address signal to provide registered cell selection signals, and storing data received from the CPU based on the registered cell selection signals.

15. The method of claim 14, wherein step (d) further includes:
   logically summing respective registered cell selection signals and the control signal to provide a resulting sum signal,
   latching a write enable signal based on the resulting sum signal to provide a latched write enable signal,
   inverting the control signal; and
   buffering the latched write enable signal in response to the inverted control signal.

16. An interrupt controller comprising:
   an interrupt mask register that receives and stores an interrupt on/off instruction from a CPU;
   an interrupt priority register that receives and stores an interrupt priority instruction from the CPU;
   an interrupt mask circuit unit that selectively receives, and provides interrupt generating signals from a peripheral device in response to the interrupt on/off instruction from the interrupt mask register;
   a priority determining circuit unit that receives the interrupt generating signals from the interrupt mask circuit unit, determines priorities of the interrupt generating signals in response to the interrupt priority instruction from the interrupt priority register, and forwards an interrupt priority signal to an interrupt terminal at the CPU;
   an interrupt status register that stores information related to a peripheral device from the interrupt priority signal, and provides a register selection signal corresponding to the information;
   an interrupt instruction register that stores a branch instruction received from the CPU, and provides an interrupt instruction to the CPU in response to the register selection signal output from the interrupt status register, wherein the interrupt instruction register comprises, a multiplexer that receives the register selection signal and a read/write control signal and selectively provides an address signal, a decoder that decodes the address signal from the multiplexer and provides register cell selection signals, a plurality of register units that store data received through an internal data bus based on the register cell selection signals provided by the decoder, and a common memory that stores a common portion of the data stored by the register unit;

a bus interface circuit unit that transfers an address signal between the CPU and the interrupt controller and provides the read/write control signal to the interrupt instruction register; and a buffer unit that buffers a data signal between the CPU and the interrupt controller.

17. The interrupt controller of claim 16, wherein the interrupt instruction register includes:

an OR gate that logically sums respective register cell selection signals and read/write control signals;

a latch unit that latches a write enable signal based on a signal from the OR gate;

an inverter that inverts the read/write control signal; and a buffer unit that buffers an output from the latch unit in response to a signal from the inverter.

18. An interrupt controller, comprising:

an interrupt instruction unit that stores branch instruction data for processing an interrupt, wherein the interrupt instruction unit comprises, a multiplexer that receives selection information corresponding to at least one peripheral device and a control signal, and selectively provides an address signal, a decoder that decodes the address signal from the multiplexer, and provides register cell selection signals, and a plurality of register units that store data received via an internal data bus based on the register cell selection signals;

a bus interface unit that, prior to an occurrence of the interrupt, transfers the branch instruction data from a CPU to the interrupt instruction unit, and that, after the occurrence of the interrupt, provides the control signal to the interrupt instruction unit; and an interrupt status unit that, after the occurrence of the interrupt, provides the selection information corresponding to at least one peripheral device;

wherein the interrupt instruction unit provides an interrupt instruction corresponding to the branch instruction data to the CPU, based on the control signal and the selection information.

19. The interrupt controller of claim 18, wherein the interrupt instruction unit further comprises a common memory that stores a common portion of the data stored by the register units.

20. An interrupt controller, comprising:

an interrupt instruction unit that stores branch instruction data for processing an interrupt, wherein the interrupt instruction unit comprises, an OR gate that logically sums respective register cell selection signals and read/write control signals, a latch unit that latches a write enable signal based on a signal from the OR gate, an inverted that inverts the read/write control signal, and a buffer unit that buffers an output from the latch unit in response to a signal from the inverter;

a bus interface unit that, prior to an occurrence of the interrupt, transfers the branch instruction data from a CPU to the interrupt instruction unit, and that, after the occurrence of the interrupt, provides the control signal to the interrupt instruction unit; and an interrupt status unit that, after the occurrence of the interrupt, provides the selection information corresponding to at least one peripheral device;

wherein the interrupt instruction unit provides an interrupt instruction corresponding to the branch instruction data to the CPU, based on the control signal and the selection information.

21. A method for operating an interrupt controller, comprising:

(a) transferring a branch instruction data to an interrupt instruction unit prior to an occurrence of an interrupt;

(b) providing a control signal to the interrupt instruction unit after the occurrence of the interrupt;

(c) providing a selection information corresponding to at least one peripheral device, after the occurrence of the interrupt; and (d) providing an interrupt instruction based on the control signal and the selection information by, providing an address signal based on the control signal and the selection information, decoding the address signal to provide register cell selection signals, and storing data received from the CPU based on the register cell selection signals, logically summing respective register cell selection signals and the control signal to provide a resulting sum signal, latching a write enable signal based on the resulting sum signal to provide a latched write enable signal, inverting the control signal, and buffering the latched write enable signal in response to the inverted control signal.

* * * * *